Feb. 16, 1960 C. R. DE WEESE ET AL 2,925,501

DISCRIMINATOR CIRCUIT

Filed Jan. 20, 1956

INVENTORS
CHARLES R. DeWEESE,
JAMES W. LACY AND
ROGER R. WEBSTER

BY Stevens, Davis, Miller & Mosher
ATTORNEYS

United States Patent Office 2,925,501

Patented Feb. 16, 1960

2,925,501

DISCRIMINATOR CIRCUIT

Charles R. De Weese, James W. Lacy, and Roger R. Webster, Dallas, Tex., assignors to Texas Instruments Incorporated, Dallas, Tex., a corporation of Delaware Application January 20, 1956, Serial No. 560,300

5 Claims. (Cl. 307—88.5)

Figure 1:
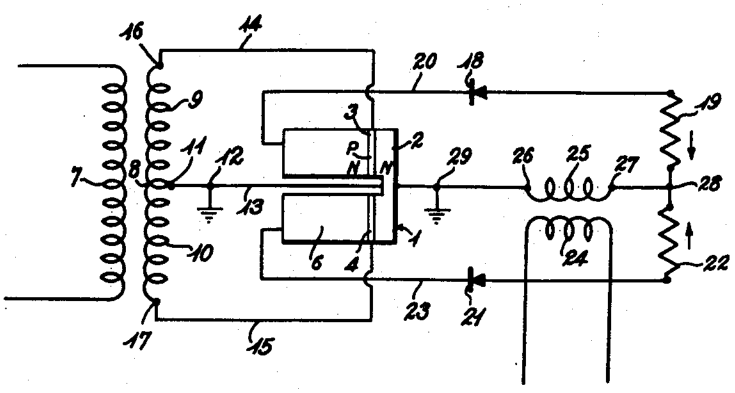

This invention relates to a novel discriminator circuit, and more particularly to a discriminator circuit in which a multi-unit transistor is employed in a unique fashion.

In known electrical circuits utilizing a multi-unit transistor, it is customary to arrange the stages of the circuit either in cascade or in push-pull so that all units of the transistor element continuously operate, or else alternately operate, in a very rapid sequence. Hence, there is no danger in these types of circuits of altering the zero signal characteristics of the units of the transistor element, since the continuous operation or rapid sequential operation maintains all units at substantially the same temperature. However, in discriminator circuits employing a multi-unit transistor element and in which one side may randomly conduct for a greater period than the other, there arises a definite problem caused by the unequal heating of the several units due to the unequal operating times. Accordingly, there is the danger that the units will have sufficiently different zero signal characteristics to destroy the usefulness of the circuit as a sense discriminator. For example, a discriminator circuit of the type described could be used to determine whether a motor is running fast or slow with respect to some reference speed. At times when the motor is running faster than the reference speed, one side of the discriminator circuit will be conducting developing a D.C. signal proportional to deviation from the reference; and when the motor is running slow, the other side will similarly conduct. If the motor may randomly run either fast or slow, one side may well be forced to remain conductive for a substantially longer period of time than the other side. Hence, unequal heating of the units of the transistor element could cause unequal zero signal characteristic changes in the respective sides, thus destroying the effectiveness of the circuit. This, in turn, could result in untrue readings.

It is therefore a principal object of this invention to provide a discriminator circuit and a transistor for use therein in which unequal operation periods in the respective sides will not result in a loss of effectiveness of the circuit. This is accomplished by the use of an n-p-n transistor provided with a transverse slot extending below the layer of p-material. Each projecting n-portion serves as a collector and is connected to one of the two sides of the discriminator circuit, while the other n-portion serves as the common emitter. Since each side of the discriminator circuit is connected to a leg of the common transistor bar, the operation of one side will heat the entire transistor bar and hence the zero signal characteristics of both of the transistor sections and of both sides of the circuit will remain substantially the same.

It is a further object to provide a slotted transistor adaptable for use in discriminator and other types of circuits such that the legs of the transistor will maintain each other at substantially the same degree of thermal activity, thus keeping the operating characteristics relatively constant and the zero signal characteristics substantially identical.

It is a further object to provide a compact and inexpensive discriminator circuit which utilizes a slotted transistor and which gives correct readings irrespective of unequal conductive periods in the respective portions of the circuit.

Figure 2:
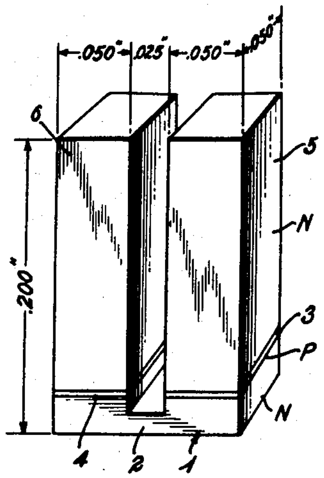

Other and further objects and advantages of the present invention will become readily apparent from the following detailed description of preferred embodiments of the invention when taken in conjunction with the appended drawings, in which:

Figure 1 is a circuit diagram of a discriminator circuit employing the slotted transistor; and Figure 2 is a perspective view of the slotted transistor showing the preferred dimensions of the transistor.

Referring now to the drawings, a slotted n-p-n transistor 1, comprising an emitter layer 2, of n-material, a pair of base layers 3 and 4, of p-material, and a pair of collector layers 5 and 6, of n-material, is provided with a transverse slot extended below the layer of p-material so that common emitter section 2 will serve the two collector sections 5 and 6. The preferred dimensions for the slotted transistor 1 are given in Figure 2.

In Figure 1 is shown a preferred embodiment of the invention. A transformer comprising a primary coil 7 and a secondary coil 8 is adapted to receive a test signal to be applied to the discriminator circuit. A center tap 11 divides secondary coil 8 into upper and lower coil portions 9 and 10, respectively. Conductor 13, which is grounded at 12, connects the tap 11 to the common emitter 2. A conductor 14 connects the upper end 16 of coil 9 and a p-layer, base section 3, while conductor 15 connects the lower end 17 of coil 10 with a p-layer, base section 4.

A diode 18 and a load resistor 19 in series are connected to the collector section 5 of the slotted transistor 1 by means of conductor 20, while diode 21 and load resistor 22 in series connect to the collector section 6 of the transistor 1 through conductor 23. The load resistors 19 and 22 may be part of a meter of some kind or their voltage drops can be coupled to suitable control apparatus. As will be evident, coils can replace resistors 19 and 22.

A reference signal is applied to the discriminator circuit through coil 24 coupled with a winding 25. End 26 of winding 25 is grounded at 29 and also connected to the emitter section 2 of the transistor 1. End 27 of winding of coil 25 leads to a point 28 forming the junction between load resistors 19 and 22.

The operation of the circuit shown in Figure 1 is as follows. Assume the test signal introduced in coil 7 is of such polarity as to make point 16 positive and point 17 negative. This causes the base 3 of transistor 1 to be positive and the base 4 to be with respect to the grounded emitter 2, negative. When the reference signal applied to coil 24 makes the collectors 5 and 6 positive with respect to the emitter 2, electrons will flow from emitter 2 to collector 5 and through resistor 19 in the direction of the arrow, since base 3 is biased positively. However, electrons will not flow in the circuit comprising resistor 22, conductor 23, collector 6, etc., because base 4 is biased negative with respect to the emitter and will prevent flow of electrons from emitter 2 to collector 6. When the reference signal applied to coil 24 reverses its polarity so as to make the collectors 5 and 6 negative with respect to the emitter, the base layer 3 and the collector 5 of the transistor act as a diode biased in the forward direction so that electron flow would tend to be in opposite direction to that shown by the arrows, that is, from the collector 5 to the base 3, through coils 9 and 25 and resistor 19 back to the collector 5. But due to the action of diode rectifier 18, now biased in the reverse direction, electron flow will be blocked. Thus, it is seen that when the test signal makes point 16 positive, electrons will flow through resistor 19 in the direction shown during the first half of the reference cycle, and no current will flow in either branch of the circuit during the second half.

But now assume that the test signal is such as to make point 17 positive and point 16 negative. This, in turn, will give base 4 a positive polarity with respect to base 3. When the reference signal is in the first half-cycle described above, i.e., making the collectors 5 and 6 positive with respect to the emitter 2, electrons will flow from emitter 2 to collector 6 due to the positive bias on base 4, but there will be no electron flow in the other circuit comprising collector 5 since base 3 is negatively biased and shuts off flow from the emitter 2 to the collector 5. Thus, electron flow will now be through resistor 22 in the direction of the arrow, while no electrons will flow in resistor 19. When the reference signal reverses so as to make the collector negative and the emitter positive, it will be seen that, as before, there will not be electron flow in either branch, due to the blocking action of the diode 21 and the negative bias on the base 3. Thus, when the test signal makes point 17 positive, an electron flow will be through resistor 22 in the direction shown during the first half of the reference cycle, while no current at all will flow during the second half.

During operation the test signal may be such as to make point 16 positive for a sufficiently longer period of time than point 17, thus making one half of the transistor operate more than the other half. If two separate transistors were used in place of what is shown, their zero signal characteristics would be altered radically due to unequal heating of the transistors. However, since collectors 5 and 6 both are a part of the same transistor 1, the operation of one half of the transistor 1 will cause the entire transistor 1 to heat up, thus insuring the same zero signal characteristics for both halves regardless of which one is in operative condition.

From the above it will be apparent that D.C. voltages are developed across resistors 19 and 22, or coils if substituted for these elements, which are proportional to the magnitude of the deviation of the input signals from a given reference, and likewise are indicative of the direction of the deviation.

Although the present invention has been shown and described with reference to a preferred embodiment, nevertheless, various changes and modifications obvious to one skilled in the art are deemed to be within the spirit and contemplation of this invention.

What is claimed is:

1. In a discriminator circuit a slotted one-piece transistor body composed of three layers of alternating opposite types of conductivity and having a transverse slot extending from one side of said body through two of said layers into the third layer, said body defining a pair of collector sections of one type conductivity, a pair of base sections of the opposite type conductivity joined to said collector sections and a common emitter section of said one type conductivity joined to said base sections, a first coil having its end leads connected in parallel to said base sections, a center tap to said first coil connected to said common emitter section, a second coil inductively coupled to said first coil and adapted to introduce test signals to said circuit, a first winding, said common emitter section connected to one end of said first winding, a pair of unilaterally conductive devices, a pair of impedance devices, each of said collector sections connected through one of said unilaterally conductive devices and one of said impedance devices to the other end of said first winding, and a second winding inductively coupled to said first winding and adapted to introduce reference signals to said circuit, the electrical properties of both transistor sections behaving substantially the same with respect to temperature changes.

2. A discriminator circuit as defined in claim 1 wherein said one type conductivity is n-type.

3. A discriminator circuit as defined in claim 1 wherein said pair of impedance devices are coils.

4. A discriminator circuit as defined in claim 1 wherein said pair of impedance devices are resistors.

5. A discriminator circuit as defined in claim 1 wherein said pair of unilaterally conducting devices are diodes.

References Cited in the file of this patent

UNITED STATES PATENTS

| | | |
|---|---|---|
| 2,655,625 | Burton | Oct. 13, 1953 |
| 2,663,806 | Darlington | Dec. 22, 1953 |
| 2,663,830 | Oliver | Dec. 22, 1953 |
| 2,677,086 | McAdie | Apr. 27, 1954 |
| 2,689,930 | Hall | Sept. 21, 1954 |
| 2,698,392 | Herman | Dec. 28, 1954 |
| 2,703,679 | Shank et al. | Mar. 8, 1955 |
| 2,722,605 | Mills | Nov. 1, 1955 |
| 2,735,948 | Sziklai | Feb. 21, 1956 |
| 2,797,261 | Polyzou | June 25, 1957 |